(12) United States Patent
Sun et al.

(10) Patent No.: US 10,986,510 B2
(45) Date of Patent: Apr. 20, 2021

(54) ELECTRONIC DEVICES HAVING SENSOR-AUGMENTED WIRELESS LINK MANAGEMENT

(71) Applicant: Apple Inc., Cupertino, CA (US)

(72) Inventors: Yakun Sun, San Jose, CA (US); Mingguang Xu, San Jose, CA (US); Mithat C. Dogan, San Jose, CA (US); Ehsan Haghani, Redwood City, CA (US); Rohit U. Nabar, Sunnyvale, CA (US); Matthew A. Mow, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 60 days.

(21) Appl. No.: 16/141,752

(22) Filed: Sep. 25, 2018

(65) Prior Publication Data

US 2020/0100118 A1  Mar. 26, 2020

(51) Int. Cl.
*H04W 16/28* (2009.01)
*H01Q 3/26* (2006.01)
*H04W 36/30* (2009.01)

(52) U.S. Cl.
CPC .......... *H04W 16/28* (2013.01); *H01Q 3/2605* (2013.01); *H04W 36/30* (2013.01)

(58) Field of Classification Search
CPC ...... H01Q 3/2605; H01Q 21/00; H01Q 21/22; H04W 16/28; H04W 36/30;
(Continued)

(56) References Cited

U.S. PATENT DOCUMENTS 10,027,397 B2  7/2018 Kim et al.
10,068,115 B2  9/2018 Liu et al.
(Continued)

FOREIGN PATENT DOCUMENTS

WO  2017083489 A1  5/2017
WO  2017151876 A1  9/2017
(Continued)

OTHER PUBLICATIONS

Yi Jiang et al., U.S. Appl. No. 15/630,841, filed Jun. 22, 2017.
Yi Jiang et al., U.S. Appl. No. 15/584,889, filed May 2, 2017.

*Primary Examiner* — Yuwen Pan
*Assistant Examiner* — Paul P Tran
(74) *Attorney, Agent, or Firm* — Treyz Law Group, P.C.; Michael H. Lyons; Jason Tsai

(57) ABSTRACT

An electronic device may be provided with wireless circuitry and control circuitry. The wireless circuitry may include a phased antenna array. Sensors and other circuitry in the electronic device may generate sensor data such as accelerometer data, gyroscope data, magnetometer data, location data, and spatial ranging data. The wireless circuitry may establish and maintain one or more wireless links with external devices based on the sensor data as the device moves over time. For example, the wireless circuitry may perform physical layer beam adjustments, inter-radio access technology handovers, intra-radio access technology handovers, and/or dual connectivity adjustments based on the sensor data. This may allow the device to maintain one or more wireless links without having to sweep the signal beam of the phased antenna array over its entire field of view each time the device has moved.

21 Claims, 11 Drawing Sheets

(58) Field of Classification Search
CPC ..... H04W 72/036; H04W 4/023; H04W 4/90; H04W 24/00; H04W 64/003; G01S 3/74; G01S 5/0205; G01S 5/0215; G01S 5/0221; G01S 5/0257; G01S 5/0263; G01S 5/0273; G01S 7/04; G01S 13/08; H04B 7/0408; H04B 7/0617; H04B 17/318

See application file for complete search history.

(56) References Cited

U.S. PATENT DOCUMENTS

| | | | |
|---|---|---|---|
| 10,110,295 B2 | 10/2018 | Bennett et al. | |
| 10,165,426 B1* | 12/2018 | Jiang | H01Q 3/36 |
| 2002/0103013 A1 | 8/2002 | Watson et al. | |
| 2013/0173315 A1* | 7/2013 | Dorsey | H04B 7/26 |
| | | | 705/5 |
| 2013/0194127 A1* | 8/2013 | Ishihara | H01Q 1/3283 |
| | | | 342/70 |
| 2014/0162704 A1* | 6/2014 | Choi | G01S 1/08 |
| | | | 455/456.6 |
| 2014/0206406 A1* | 7/2014 | Cordeiro | H04W 72/046 |
| | | | 455/501 |
| 2015/0131616 A1* | 5/2015 | Jo | H04W 36/0083 |
| | | | 370/331 |
| 2015/0188678 A1* | 7/2015 | Wu | H04B 7/0617 |
| | | | 370/329 |
| 2015/0245251 A1* | 8/2015 | Somayazulu | H04W 36/32 |
| | | | 370/329 |
| 2016/0248451 A1* | 8/2016 | Weissman | H04B 1/0064 |
| 2016/0306034 A1* | 10/2016 | Trotta | G01S 13/34 |
| 2017/0034812 A1 | 2/2017 | Deng et al. | |
| 2017/0230893 A1* | 8/2017 | Miao | H04W 36/08 |
| 2017/0331670 A1* | 11/2017 | Parkvall | H04J 11/0056 |
| 2017/0359106 A1* | 12/2017 | John Wilson | H04B 7/0408 |
| 2017/0373740 A1 | 12/2017 | Guo et al. | |
| 2018/0123751 A1* | 5/2018 | Narasimha | H04W 48/00 |
| 2018/0227771 A1 | 8/2018 | Malik et al. | |
| 2020/0252838 A1* | 8/2020 | Akdeniz | H04W 36/0061 |

FOREIGN PATENT DOCUMENTS

| | | |
|---|---|---|
| WO | 2017167532 A1 | 10/2017 |
| WO | 2018009468 A1 | 1/2018 |
| WO | 2018175442 A1 | 9/2018 |

* cited by examiner

ELECTRONIC DEVICES HAVING
SENSOR-AUGMENTED WIRELESS LINK
MANAGEMENT

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It may be desirable to support wireless communications in millimeter wave and centimeter wave communications bands. Millimeter wave communications, which are sometimes referred to as extremely high frequency (EHF) communications, and centimeter wave communications involve communications at frequencies of about 10-300 GHz. Operation at these frequencies may support high bandwidths, but may raise significant challenges. For example, millimeter wave communications signals generated by antennas can be characterized by substantial attenuation and/or distortion during signal propagation through various mediums.

It would therefore be desirable to be able to provide electronic devices with improved wireless communications circuitry such as communications circuitry that supports millimeter and centimeter wave communications.

SUMMARY

An electronic device may be provided with wireless circuitry and control circuitry. The wireless circuitry may include a phased antenna array. Sensors and other circuitry in the electronic device may generate sensor data such as accelerometer data, gyroscope data, magnetometer data, location data, and spatial ranging data. The phased antenna array may convey a beam of signals at a frequency between 10 GHz and 300 GHz. The wireless circuitry may establish and maintain one or more wireless links with external devices based on the sensor data as the device moves over time (e.g., to maintain the wireless links without having to sweep the beam over the entire field of view of the phased antenna array each time the device has moved). For example, the wireless circuitry may perform physical layer beam adjustments on the phased antenna array based on the sensor data.

Wireless data may be conveyed using radio-frequency signals for each wireless link. At least one of the wireless links may be maintained using a millimeter wave radio access technology. The control circuitry may perform a handover of the wireless data based on the sensor data (e.g., based on device motions identified or predicted by the sensor data). For example, the control circuitry may perform the handover from a first external device operating using a millimeter wave radio access technology to a second external device operating using a non-millimeter wave radio access technology. As another example, the control circuitry may perform the handover between two external devices operating using millimeter wave radio access technologies or by adjusting a frequency of the wireless link. If desired, the control circuitry may maintain and/or adjust two concurrent wireless links based on the sensor data.

If desired, the control circuitry may gather information identifying the location of one or more external devices relative to the electronic device. The control circuitry may determine whether an external device that operates using a millimeter wave radio access technology is present within a field of view of the phased antenna array based on the sensor data. The control circuitry may establish a wireless link with a different external device that operates using a non-millimeter wave radio access technology in response to determining that no external devices that operate using the millimeter wave radio access technology are present within the field of view.

DETAILED DESCRIPTION

Figure 1:
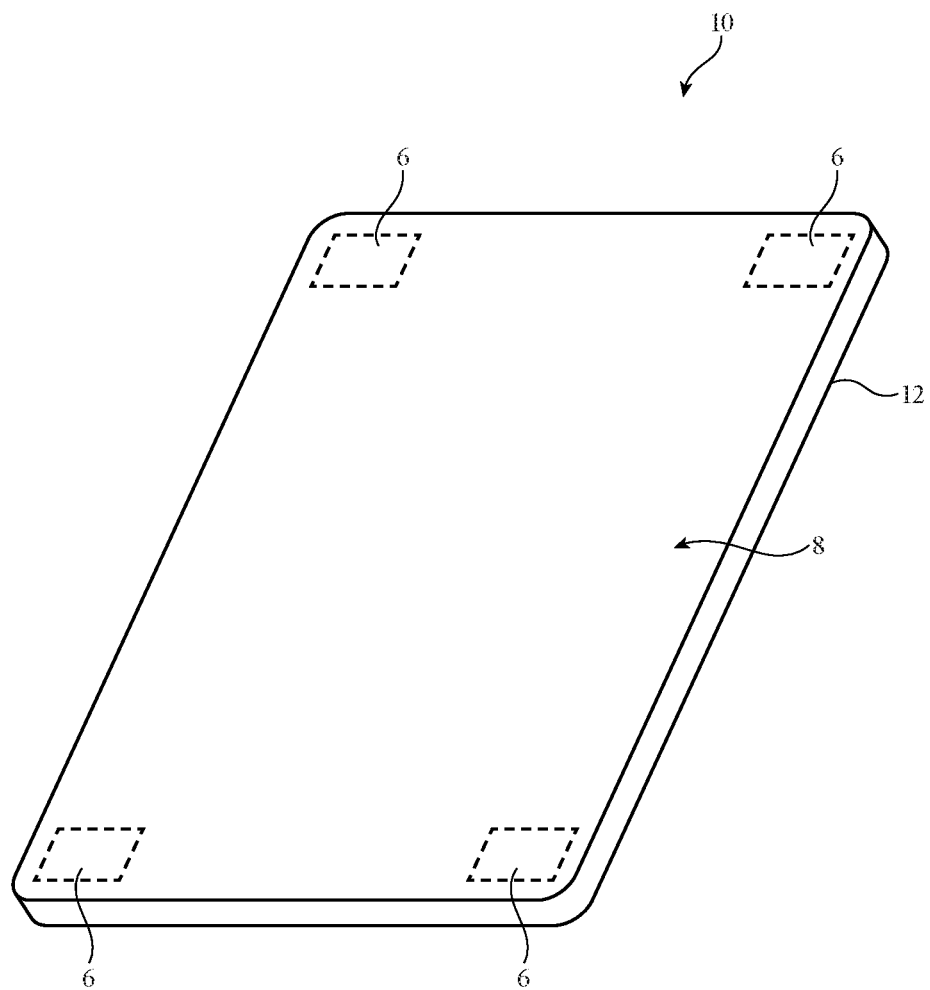
FIG. 1 is a perspective view of an illustrative electronic device with wireless communications circuitry in accordance with some embodiments.

An electronic device such as electronic device 10 of FIG. 1 may contain wireless circuitry. The wireless circuitry may include one or more antennas. The antennas may include phased antenna arrays that are used for handling millimeter wave and centimeter wave communications. Millimeter wave communications, which are sometimes referred to as extremely high frequency (EHF) communications, involve signals at 60 GHz or other frequencies between about 30 GHz and 300 GHz. Centimeter wave communications involve signals at frequencies between about 10 GHz and 30 GHz. If desired, device 10 may also contain wireless communications circuitry for handling satellite navigation system signals, cellular telephone signals, local wireless area network signals, near-field communications, light-based wireless communications, or other wireless communications.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless access point or base station, a desktop computer, a keyboard, a gaming controller, a computer mouse, a mousepad, a trackpad or touchpad, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

As shown in FIG. 1, device 10 may include a display such as display 8. Display 8 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 8 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 8 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 8 may be protected using a display cover layer such as a layer of transparent glass, clear plastic, sapphire, or other transparent dielectric. Openings may be formed in the display cover layer. For example, openings may be formed in the display cover layer to accommodate one or more buttons, sensor circuitry such as a fingerprint sensor or light sensor, ports such as a speaker port or microphone port, etc. Openings may be formed in housing 12 to form communications ports (e.g., an audio jack port, a digital data port, charging port, etc.). Openings in housing 12 may also be formed for audio components such as a speaker and/or a microphone.

Antennas may be mounted in housing 12. If desired, some of the antennas (e.g., antenna arrays that may implement beam steering, etc.) may be mounted under an inactive border region of display 8 (see, e.g., illustrative antenna locations 6 of FIG. 1). Display 8 may contain an active area with an array of pixels (e.g., a central rectangular portion). Inactive areas of display 8 are free of pixels and may form borders for the active area. If desired, antennas may also operate through dielectric-filled openings in the rear of housing 12 or elsewhere in device 10.

To avoid disrupting communications when an external object such as a human hand or other body part of a user blocks one or more antennas, antennas may be mounted at multiple locations in housing 12. Sensor data such as proximity sensor data, real-time antenna impedance measurements, signal quality measurements such as received signal strength information, and other data may be used in determining when one or more antennas is being adversely affected due to the orientation of housing 12, blockage by a user's hand or other external object, or other environmental factors. Device 10 can then switch one or more replacement antennas into use in place of the antennas that are being adversely affected.

Antennas may be mounted at the corners of housing 12 (e.g., in corner locations 6 of FIG. 1 and/or in corner locations on the rear of housing 12), along the peripheral edges of housing 12, on the rear of housing 12, under the display cover glass or other dielectric display cover layer that is used in covering and protecting display 8 on the front of device 10, under a dielectric window on a rear face of housing 12 or the edge of housing 12, or elsewhere in device 10.

Figure 2:
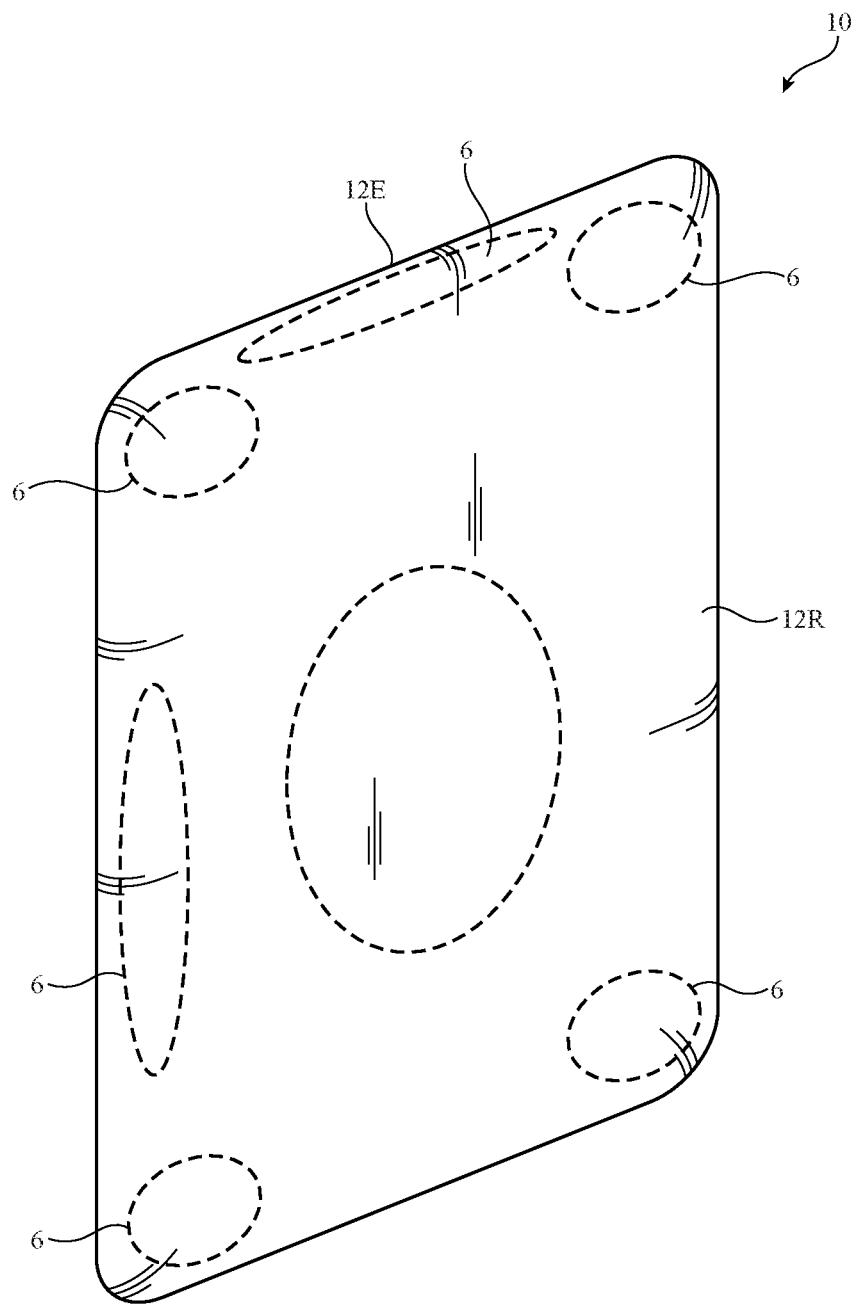
FIG. 2 is a rear perspective view of an illustrative electronic device in accordance with some embodiments.

FIG. 2 is a rear perspective view of electronic device 10 showing illustrative locations 6 on the rear and sides of housing 12 in which antennas (e.g., single antennas and/or phased antenna arrays) may be mounted in device 10. The antennas may be mounted at the corners of device 10, along the edges of housing 12 such as edges formed by sidewalls 12E, on upper and lower portions of rear housing portion (wall) 12R, in the center of rear housing wall 12R (e.g., under a dielectric window structure or other antenna window in the center of rear housing 12R), at the corners of rear housing wall 12R (e.g., on the upper left corner, upper right corner, lower left corner, and lower right corner of the rear of housing 12 and device 10), etc.

In configurations in which housing 12 is formed entirely or nearly entirely from a dielectric, the antennas may transmit and receive antenna signals through any suitable portion of the dielectric. In configurations in which housing 12 is formed from a conductive material such as metal, regions of the housing such as slots or other openings in the metal may be filled with plastic or other dielectric. The antennas may be mounted in alignment with the dielectric in the openings. These openings, which may sometimes be referred to as dielectric antenna windows, dielectric gaps, dielectric-filled openings, dielectric-filled slots, elongated dielectric opening regions, etc., may allow antenna signals to be transmitted to external wireless equipment from the antennas mounted within the interior of device 10 and may allow internal antennas to receive antenna signals from external wireless equipment. In another suitable arrangement, the antennas may be mounted on the exterior of conductive portions of housing 12.

Figure 3:
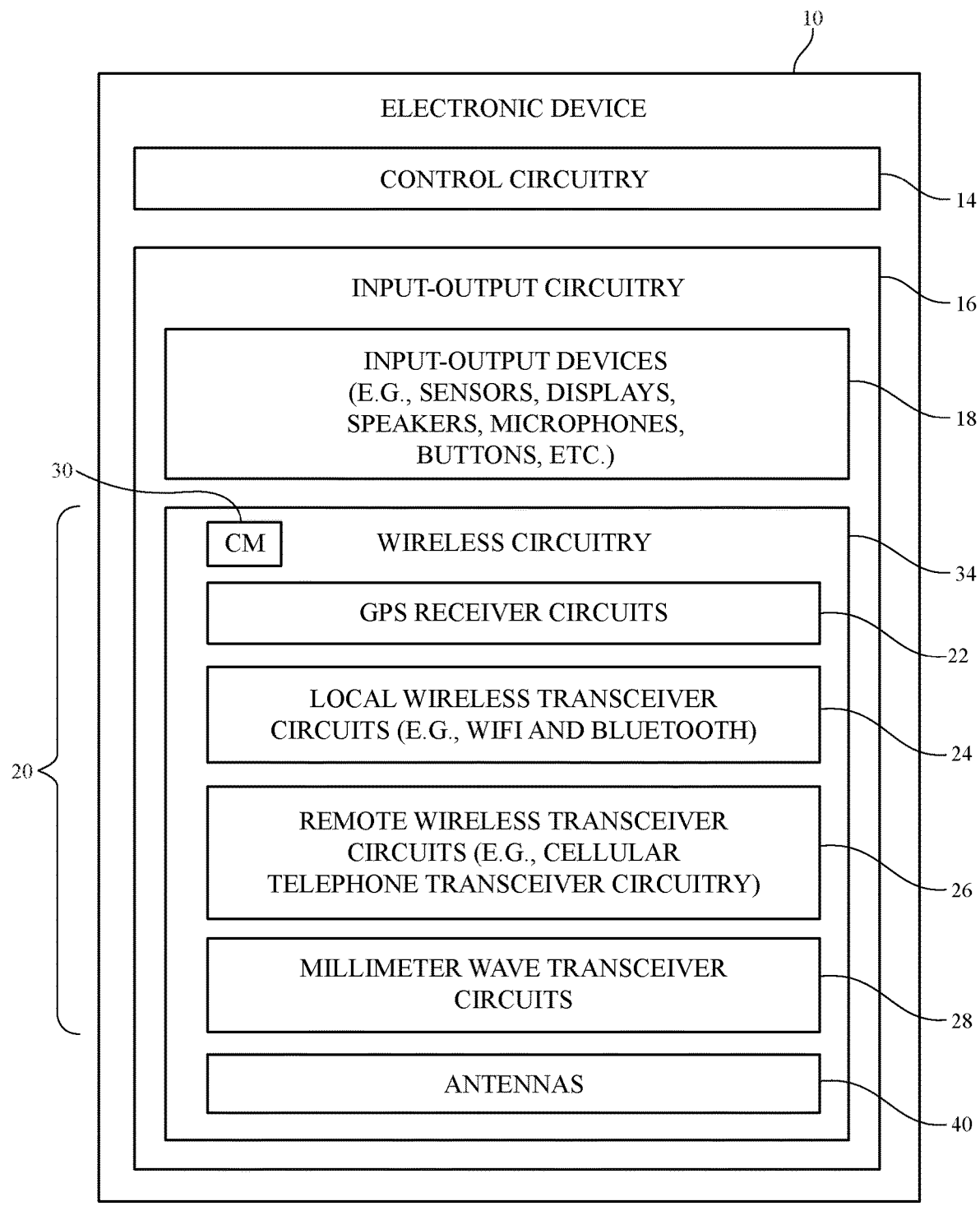
FIG. 3 is a schematic diagram of an illustrative electronic device with wireless communications circuitry in accordance with some embodiments.

A schematic diagram showing illustrative components that may be used in device 10 is shown in FIG. 3. As shown in FIG. 3, device 10 may include storage and processing circuitry such as control circuitry 14. Control circuitry 14 may include storage such as hard disk drive storage, non-volatile memory (e.g., flash memory or other electrically-programmable-read-only memory configured to form a solid state drive), volatile memory (e.g., static or dynamic random-access-memory), etc. Processing circuitry in control circuitry 14 may be used to control the operation of device 10. This processing circuitry may be based on one or more microprocessors, microcontrollers, digital signal processors, host processors, baseband processor integrated circuits, application specific integrated circuits, etc.

Control circuitry 14 may be used to run software on device 10 such as internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.1 1ad protocols, cellular telephone protocols, MIMO protocols, antenna diversity protocols, satellite navigation system protocols, etc. Each communication protocol may be associated with a corresponding radio access technology (RAT) that specifies the physical connection methodology used in implementing the protocol.

Device 10 may include input-output circuitry 16. Input-output circuitry 16 may include input-output devices 18. Input-output devices 18 may be used to allow data to be supplied to device 10 and to allow data to be provided from device 10 to external devices. Input-output devices 18 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 16 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas 40, transmission lines, and other circuitry for handling RF wireless signals. Wireless signals can also be sent using light (e.g., using infrared communications).

Wireless communications circuitry 34 may include transceiver circuitry 20 for handling various radio-frequency communications bands. For example, circuitry 34 may include transceiver circuitry 22, 24, 26, and 28.

Transceiver circuitry 24 may be wireless local area network (WLAN) transceiver circuitry. Transceiver circuitry 24 may handle 2.4 GHz and 5 GHz bands for WiFi® (IEEE 802.11) communications and may handle the 2.4 GHz Bluetooth® communications band.

Circuitry 34 may use cellular telephone transceiver circuitry 26 for handling wireless communications in frequency ranges such as a communications band from 700 to 960 MHz, a communications band from 1710 to 2170 MHz, and a communications band from 2300 to 2700 MHz or other communications bands between 600 MHz and 4000 MHz or other suitable frequencies (as examples). Circuitry 26 may handle voice data and non-voice data.

Millimeter wave transceiver circuitry 28 (sometimes referred to as extremely high frequency (EHF) transceiver circuitry 28 or transceiver circuitry 28) may support communications at frequencies between about 10 GHz and 300 GHz. For example, transceiver circuitry 28 may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, transceiver circuitry 28 may support communications in an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, circuitry 28 may support IEEE 802.11ad communications at 60 GHz and/or $5^{th}$ generation mobile networks or $5^{th}$ generation wireless systems (5G) communications bands between 27 GHz and 90 GHz. If desired, circuitry 28 may support communications at multiple frequency bands between 10 GHz and 300 GHz such as a first band from 27.5 GHz to 29.5 GHz, a second band from 37 GHz to 41 GHz, and a third band from 57 GHz to 71 GHz, or other communications bands between 10 GHz and 300 GHz. Circuitry 28 may be formed from one or more integrated circuits (e.g., multiple integrated circuits mounted on a common printed circuit in a system-in-package device, one or more integrated circuits mounted on different substrates, etc.). While circuitry 28 is sometimes referred to herein as millimeter wave transceiver circuitry 28, millimeter wave transceiver circuitry 28 may handle communications at any desired communications bands at frequencies between 10 GHz and 300 GHz (e.g., in millimeter wave communications bands, centimeter wave communications bands, etc.).

Wireless communications circuitry 34 may include satellite navigation system circuitry such as Global Positioning System (GPS) receiver circuitry 22 for receiving GPS signals at 1575 MHz or for handling other satellite positioning data (e.g., GLONASS signals at 1609 MHz). Satellite navigation system signals for receiver 22 are received from a constellation of satellites orbiting the earth.

In satellite navigation system links, cellular telephone links, and other long-range links, wireless signals are typically used to convey data over thousands of feet or miles. In WiFi® and Bluetooth® links at 2.4 and 5 GHz and other short-range wireless links, wireless signals are typically used to convey data over tens or hundreds of feet. Extremely high frequency (EHF) wireless transceiver circuitry 28 may convey signals over short distances that travel between transmitter and receiver over a line-of-sight path. To enhance signal reception for millimeter and centimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 10 can be switched out of use and higher-performing antennas used in their place.

Wireless communications circuitry 34 can include circuitry for other short-range and long-range wireless links if desired. For example, wireless communications circuitry 34 may include circuitry for receiving television and radio signals, paging system transceivers, near field communications (NFC) circuitry, etc.

Wireless communications circuitry 34 may include circuitry for performing communications using multiple different radio access technologies (e.g., using communications protocols associated with each radio access technology). Wireless circuitry 34 may perform communications using millimeter wave radio access technologies (e.g., RATs associated with signals between 10 GHz and 300 GHz such as a 5G and IEEE 802.1 lad radio access technologies) with transceiver circuitry 28. Similarly, wireless circuitry 34 may perform communications using non-millimeter wave radio access technologies (e.g., RATs associated with signals below 10 GHz such as Wi-Fi, Bluetooth, cellular 3G, and cellular 4G (LTE) radio access technologies) with transceiver circuitry 24 and 26.

Wireless communications circuitry 34 may include wireless connection management circuitry such as wireless connection manager (CM) 30 for managing wireless communications across one or more radio access technologies. Connection manager 30 (sometimes referred to herein as a connection management engine) may be implemented on dedicating processing circuitry or on control circuitry 14. Connection manager 30 may, for example, control antenna beam forming using arrays of antennas 40, may control transceiver circuitry 20 to establish and manage (adjust) wireless links using one or more radio access technologies, and/or may control handover operations within a given radio access technology or across radio access technologies for wireless communications circuitry 34.

The control circuitry in device 10 (e.g., control circuitry 14 and connection manager 30) may be configured to perform operations in device 10 using hardware (e.g., dedicated hardware or circuitry), firmware, and/or software. Software code for performing operations in device 10 is stored on non-transitory computer readable storage media (e.g., tangible computer readable storage media) in control circuitry 14 and/or connection manager 30. The software code may sometimes be referred to as program instructions, software, data, instructions, or code. The non-transitory computer readable storage media may include non-volatile memory such as non-volatile random-access memory (NVRAM), one or more hard drives (e.g., magnetic drives or solid state drives), one or more removable flash drives or other removable media, etc. Software stored on the non-transitory computer readable storage media may be executed on the processing circuitry of control circuitry 16 and/or communication manager 30. The processing circuitry may include application-specific integrated circuits with processing circuitry, one or more microprocessors, a central processing unit (CPU) or other processing circuitry.

Antennas 40 in wireless communications circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, monopoles, dipoles, helical antenna structures, Yagi (Yagi-Uda) antenna structures, hybrids of these designs, etc. If desired, one or more of antennas 40 may be cavity-backed antennas. Different types of antennas may be used for different bands and combinations of bands. For example, one type of antenna may be used in forming a millimeter wave wireless links using a millimeter wave RAT and another type of antenna may be used in forming non-millimeter wave links using a non-millimeter wave RAT. Dedicated antennas may be used for receiving satellite navigation system signals or, if desired, antennas 40 can be configured to receive both satellite navigation system signals and signals for other communications bands (e.g., wireless local area network signals and/or cellular telephone signals). Antennas 40 can include two or more antennas arranged within one or more phased antenna arrays for handling millimeter and centimeter wave communications.

Transmission line paths may be used to route antenna signals within device 10. For example, transmission line paths may be used to couple antennas 40 to transceiver circuitry 20. Transmission line paths in device 10 may include transmission lines such as coaxial cable transmission lines, coaxial probes realized by metalized vias, microstrip transmission lines, stripline transmission lines, edge-coupled microstrip transmission lines, edge-coupled stripline transmission lines, waveguide structures, transmission lines formed from combinations of transmission lines of these types, etc.

Transmission lines in device 10 may be integrated into rigid and/or flexible printed circuit boards. In one suitable arrangement, transmission lines in device 10 may also include transmission line conductors (e.g., signal and ground conductors) integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive). Filter circuitry, switching circuitry, impedance matching circuitry, and other circuitry may be interposed on the transmission lines, if desired.

In devices such as handheld devices, the presence of an external object such as the hand of a user or a table or other surface on which a device is resting has a potential to block wireless signals such as millimeter wave signals. Accordingly, it may be desirable to incorporate multiple antennas or phased antenna arrays into device 10, each of which is placed in a different location within device 10. With this type of arrangement, an unblocked antenna or phased antenna array may be switched into use. In scenarios where a phased antenna array is formed in device 10, once switched into use, the phased antenna array may use beam steering to optimize wireless performance. Configurations in which antennas from one or more different locations in device 10 are operated together may also be used. In devices with phased antenna arrays, circuitry 34 may include gain and phase adjustment circuitry that is used in adjusting the signals associated with each antenna 40 in an array (e.g., to perform beam steering). Switching circuitry may be used to switch desired antennas 40 into and out of use.

Figure 4:
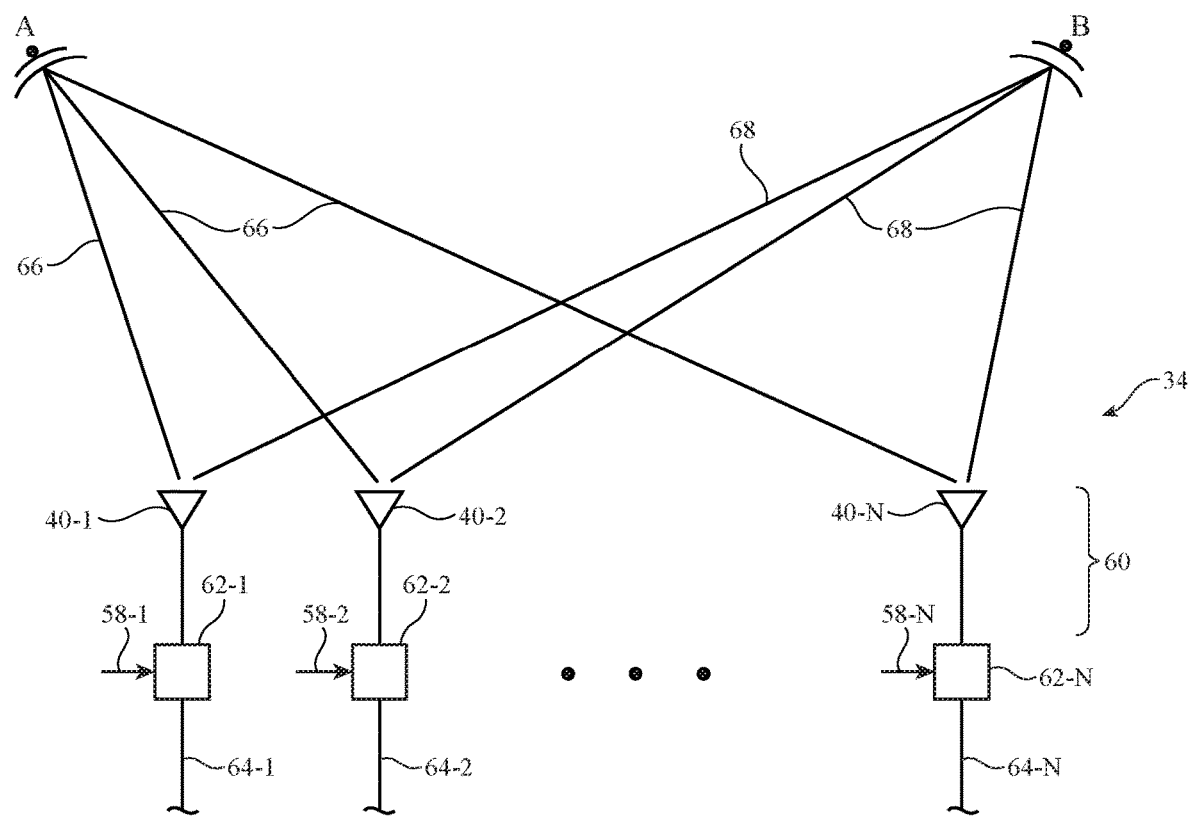
FIG. 4 is a diagram of an illustrative phased antenna array that may be adjusted using control circuitry to direct a beam of signals in accordance with some embodiments.

FIG. 4 shows how antennas 40 for handling millimeter and centimeter wave communications may be formed in a phased antenna array. As shown in FIG. 4, phased antenna array 60 (sometimes referred to herein as array 60, antenna array 60, or array 60 of antennas 40) may be coupled to signal paths such as transmission line paths 64 (e.g., one or more radio-frequency transmission lines). For example, a first antenna 40-1 in phased antenna array 60 may be coupled to a first transmission line path 64-1, a second antenna 40-2 in phased antenna array 60 may be coupled to a second transmission line path 64-2, an Nth antenna 40-N in phased antenna array 60 may be coupled to an Nth transmission line path 64-N, etc. While antennas 40 are described herein as forming a phased antenna array, the antennas 40 in phased antenna array 60 may sometimes be referred to as collectively forming a single phased array antenna.

Antennas 40 in phased antenna array 60 may be arranged in any desired number of rows and columns or in any other desired pattern (e.g., the antennas need not be arranged in a grid pattern having rows and columns). During signal transmission operations, transmission line paths 64 may be used to supply signals (e.g., radio-frequency signals such as millimeter wave and/or centimeter wave signals) from transceiver circuitry 28 (FIG. 3) to phased antenna array 60 for wireless transmission to external wireless equipment. During signal reception operations, transmission line paths 64 may be used to convey signals received at phased antenna array 60 from external wireless equipment to transceiver circuitry 28 (FIG. 3).

The use of multiple antennas 40 in phased antenna array 60 allows beam steering arrangements to be implemented by controlling the relative phases and magnitudes (amplitudes) of the radio-frequency signals conveyed by the antennas. In the example of FIG. 4, antennas 40 each have a corresponding radio-frequency phase and magnitude controller 62 (e.g., a first phase and magnitude controller 62-1 interposed on transmission line path 64-1 may control phase and magnitude for radio-frequency signals handled by antenna 40-1, a second phase and magnitude controller 62-2 interposed on transmission line path 64-2 may control phase and magnitude for radio-frequency signals handled by antenna 40-2, an Nth phase and magnitude controller 62-N interposed on transmission line path 64-N may control phase and magnitude for radio-frequency signals handled by antenna 40-N, etc.).

Phase and magnitude controllers 62 may each include circuitry for adjusting the phase of the radio-frequency signals on transmission line paths 64 (e.g., phase shifter circuits) and/or circuitry for adjusting the magnitude of the radio-frequency signals on transmission line paths 64 (e.g., power amplifier and/or low noise amplifier circuits). Phase and magnitude controllers 62 may sometimes be referred to collectively herein as beam steering circuitry (e.g., beam steering circuitry that steers the beam of radio-frequency signals transmitted and/or received by phased antenna array 60).

Phase and magnitude controllers 62 may adjust the relative phases and/or magnitudes of the transmitted signals that are provided to each of the antennas in phased antenna array 60 and may adjust the relative phases and/or magnitudes of the received signals that are received by phased antenna array 60 from external wireless equipment. Phase and magnitude controllers 62 may, if desired, include phase detection circuitry for detecting the phases of the received signals that are received by phased antenna array 60 from external wireless equipment. The term "beam" or "signal beam" may be used herein to collectively refer to wireless signals that are transmitted and received by phased antenna array 60 in a particular direction. The signal beam may exhibit a peak gain that is oriented in a particular pointing direction at a corresponding pointing angle (e.g., based on constructive and destructive interference from the combination of signals from each antenna in the phased antenna array). The term "transmit beam" may sometimes be used herein to refer to radio-frequency signals that are transmitted in a particular direction whereas the term "receive beam" may sometimes be used herein to refer to radio-frequency signals that are received from a particular direction.

If, for example, phase and magnitude controllers 62 are adjusted to produce a first set of phases and/or magnitudes for transmitted millimeter wave signals, the transmitted signals will form a millimeter wave frequency transmit beam as shown by beam 66 of FIG. 4 that is oriented in the direction of point A. If, however, phase and magnitude controllers 62 are adjusted to produce a second set of phases and/or magnitudes for the transmitted millimeter wave signals, the transmitted signals will form a millimeter wave frequency transmit beam as shown by beam 68 that is oriented in the direction of point B. Similarly, if phase and magnitude controllers 62 are adjusted to produce the first set of phases and/or magnitudes, wireless signals (e.g., millimeter wave signals in a millimeter wave frequency receive beam) may be received from the direction of point A as shown by beam 66. If phase and magnitude controllers 62 are adjusted to produce the second set of phases and/or magnitudes, signals may be received from the direction of point B, as shown by beam 68.

Each phase and magnitude controller 62 may be controlled to produce a desired phase and/or magnitude based on a corresponding control signal 58 received from control circuitry 14 of FIG. 3 or other control circuitry in device 10 (e.g., the phase and/or magnitude provided by phase and magnitude controller 62-1 may be controlled using control signal 58-1, the phase and/or magnitude provided by phase and magnitude controller 62-2 may be controlled using control signal 58-2, etc.). If desired, control circuitry 14 may actively adjust control signals 58 in real time to steer the transmit or receive beam in different desired directions over time. Phase and magnitude controllers 62 may provide information identifying the phase of received signals to control circuitry 14 if desired.

When performing millimeter or centimeter wave communications, radio-frequency signals are conveyed over a line of sight path between phased antenna array 60 and external wireless equipment. If the external wireless equipment is located at point A of FIG. 4, phase and magnitude controllers 62 may be adjusted to steer the signal beam towards point A (e.g., to steer the pointing direction of the signal beam towards point A). If the external equipment is located at location B, phase and magnitude controllers 62 may be adjusted to steer the signal beam towards direction B. In the example of FIG. 4, beam steering is shown as being performed over a single degree of freedom for the sake of simplicity (e.g., towards the left and right on the page of FIG. 4). However, in practice, the beam is steered over two or more degrees of freedom (e.g., in three dimensions, into and out of the page and to the left and right on the page of FIG. 4).

Figure 5:
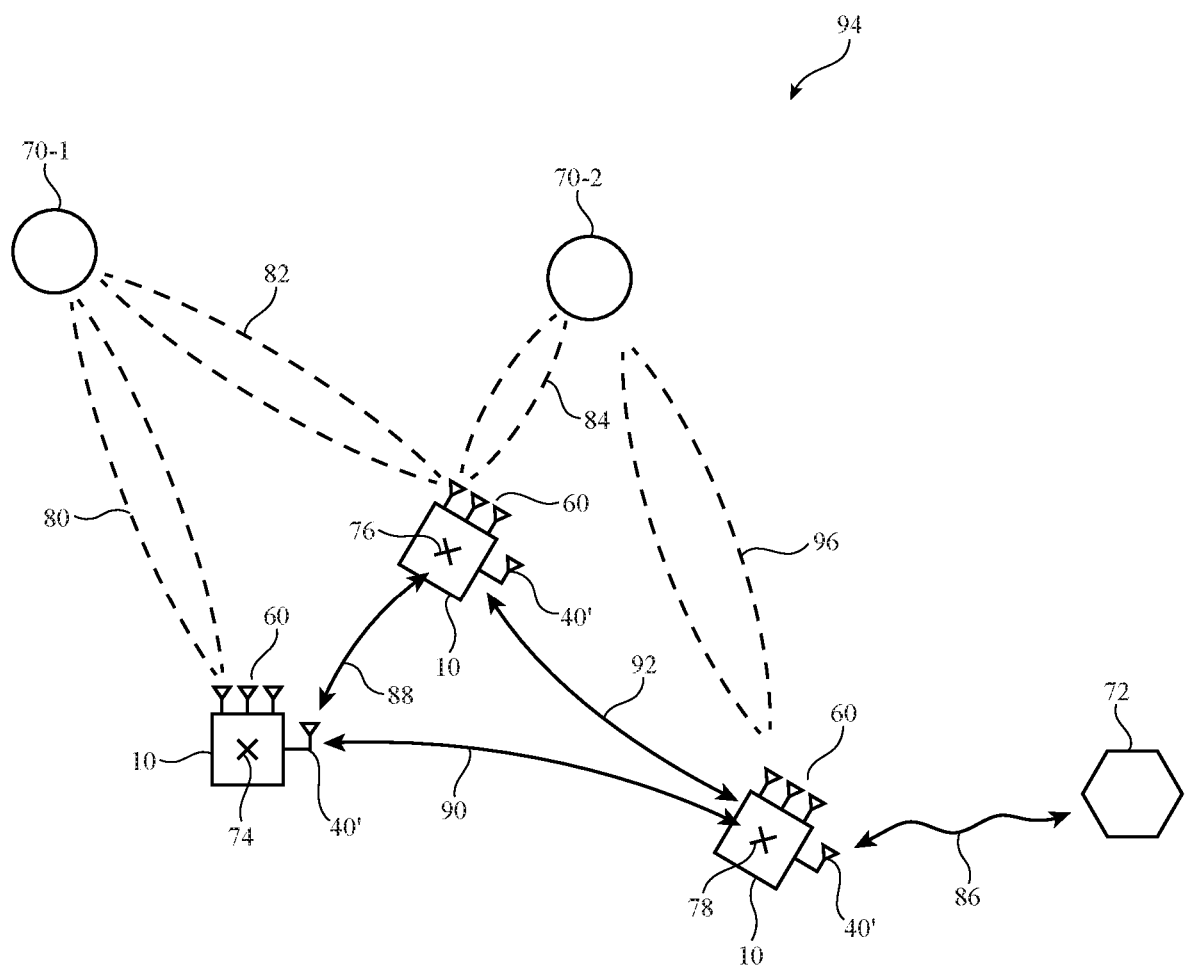
FIG. 5 is a diagram of an illustrative communications system that may include wireless equipment from one or more radio access technologies in accordance with some embodiments.

Device 10 may communicate with multiple external wireless devices during operation. FIG. 5 is a diagram of a communications system 94 in which device 10 may perform communications with multiple external wireless devices. As shown in FIG. 5, communications system (network) 94 may include external wireless equipment that operates using a millimeter wave radio access technology (e.g., using signals between 10 GHz and 300 GHz) such as one or more external millimeter wave devices 70. In the example of FIG. 5, communications system 94 includes a first external millimeter wave device 70-1 and a second external millimeter wave device 70-2. Communications system 94 may also include external wireless equipment that operates using non-millimeter wave radio access technologies such as one or more external non-millimeter wave devices 72. External millimeter wave devices 70-1 and 70-2 and external non-millimeter wave device 72 may each be wireless access points or wireless base stations in one suitable arrangement that is sometimes described herein as an example.

In general, external devices 70-1, 70-2, and 72 may each include other electronic devices such as an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a desktop computer, a keyboard, a gaming controller, a computer mouse, a mousepad, a trackpad or touchpad.

As shown in FIG. 5, device 10 may initially be located at location (position) 74 in communications system 94. From location 74, communication manger 30 (FIG. 3) may control phased antenna array 60 to sweep over different beam angles (e.g., pointing angles associated with corresponding beam indices) until external millimeter wave device 70-1 is found. Device 10 and external millimeter wave device 70-1 may subsequently convey radio-frequency signals at millimeter or centimeter wave frequencies over signal beam 80. This beam sweeping operation (sometimes referred to herein as a beam scanning operation) may involve device 10 transmitting probe signals over a sequence of different beam directions with phased antenna array 60, waiting for a feedback response from an external device (e.g., external millimeter wave device 70-1) in response to the probe signals, and selecting a beam direction for subsequent communications based on the response (e.g., a beam direction that exhibits a maximum signal strength). This process may take a relatively long amount of time, which can increase the risk of loss or interruption to the wireless data conveyed by device 10, particularly in scenarios where device 10 undergoes motion.

For example, device 10 may be rotated or may move to another location. If external millimeter wave device 70-1 remains within the field of view of phased antenna array 60, phased antenna array 60 may continue to convey radio-frequency signals with external millimeter wave device 70-1. For example, device 10 may move to location (position) 76 of FIG. 5, as shown by arrow 88. Once device 10 has moved to location 76, communication manager 30 (FIG. 3) may control phased antenna array 60 to sweep over different beam angles until external millimeter wave device 70-1 is found. Device 10 and external millimeter wave device 70-1 may subsequently convey radio-frequency signals over beam 82.

Regularly sweeping over different beam angles to ensure that a wireless link between device 10 and external millimeter wave device 70-1 is maintained as device 10 moves is a relatively slow process and may introduce excessive latency into communications system 94. This latency may serve to degrade or interrupt communications between the devices. If desired, sensor data gathered by device 10 may be used to help determine where to steer the signal beam as device 10 moves over time (e.g., to minimize the amount of time spent beam sweeping). This sensor data may include motion sensor data (e.g., accelerometer data and/or gyroscope data), magnetometer data (e.g., compass data), millimeter wave spatial ranging information (e.g., spatial ranging data generated using transceiver circuitry 28 of FIG. 3), satellite navigation data (e.g., location data generated by GPS receiver circuitry 22 of FIG. 3), and/or sensor data generated by other sensors in input-output devices 18 of FIG. 3.

For example, the sensor data may identify that device 10 has moved to location 76 (e.g., with a particular orientation). Device 10 may use this information in combination with the previous known beam direction (e.g., the direction of beam 80) to determine the new direction towards external millimeter wave device 70-1 after device 10 has moved to location 76. Device 10 may subsequently steer phased antenna array 60 towards this new direction (e.g., as shown by beam 82), thereby eliminating the need to scan over all beam angles until external millimeter wave device 70-1 is found. This may reduce the amount of time required to steer the beam towards external millimeter wave device 70-1 and may serve to reduce or minimize latency in communications system 94.

Other challenges may arise when device 10 has moved to a location and/or orientation such that external millimeter wave device 70-1 no longer lies in the field of view of phased antenna array 60. In the example of FIG. 5, device 10 may move from location 74 to location (position) 78, as shown by arrow 90. At location 78, external millimeter wave device 70-1 may lie outside the range and/or field of view of phased antenna array 60. Connection manager 30 (FIG. 3) may subsequently scan through beam angles of phased antenna array 60 until another external millimeter wave device such as device 70-2 is found. Device 10 and external millimeter wave device 70-2 may subsequently convey radio-frequency signals at millimeter or centimeter wave frequencies over signal beam 96. Device 10 may also use sensor data to help reduce the latency associated with establishing beam 96 in the direction of external millimeter wave device 70-2. For example, device 10 may identify the location of external millimeter wave device 70-2 (e.g., relative to device 10) using the sensor data and may use the identified location to produce beam 96. If desired, device 10 may perform a finer beam sweep around the location identified in the sensor data until a beam angle exhibiting maximum signal strength is found (e.g., without sweeping over the entire field of view of the array).

Sensor data may also be used by device 10 to perform other operations associated with establishing and maintaining wireless links with external wireless equipment in communications system 94. For example, device 10 may use the sensor data to perform handover (handoff) operations as device 10 moves over time. In these scenarios, device 10 conveys a stream of wireless data (e.g., wireless audio data, wireless video data, or other wireless data traffic that includes a corresponding sequence or stream of data packets). Each of external devices 70-1, 70-2, and 72 may be coupled to each other and/or other networks (e.g., the internet) over wired and/or wireless links. In performing device handover operations, device 10 may be conveying a stream of wireless data with one of external devices 70-1, 70-2, or 72, and may switch to conveying the stream of wireless data with another one of external devices 70-1, 70-2, and 72 without noticeably interrupting the wireless data flow (e.g., to provide device 10 with a continuous stream of wireless data such as audio, voice, or video data as device 10 moves over time). External devices 70-1, 70-2, and 72 may communicate with each other and/or other networks (e.g., a service provider network, operator network, the internet, etc.) to ensure that the wireless data conveyed with device 10 reaches a desired end host of the network.

Consider an example in which device 10 moves from location 74 to location 76. Device 10 may use the sensor data to determine that external millimeter wave device 70-2 lies within the field of view of phased antenna array 60 at location 76 (e.g., that device 10 will likely exhibit superior link quality with external millimeter wave device 70-2 than with external millimeter wave device 70-1 due to the closer proximity of device 70-2, etc.). Device 10 may convey data to external millimeter device 70-1 indicating that device 10 is going to begin performing communications with external millimeter wave device 70-2 (e.g., over beam 82). Device 10 may then begin communications with external millimeter wave device 70-2 over beam 84 (e.g., without data or packet loss associated with the stream of wireless data that was initially being conveyed between devices 70-1 and 10). This type of handover operation may sometimes be referred to as intra-RAT handover operations, because the handover operations are performed between two external wireless devices operating under the same RAT (e.g., a millimeter wave RAT).

Device 10 may also use the sensor data to perform inter-RAT handover operations between different radio access technologies. For example, device 10 may convey wireless data with external millimeter wave device 70-1 over beam 80 at location 74. If device 10 moves from location 74 to location 78 and the sensor data indicates that either external millimeter wave device 70-2 is not within the field of view of phased antenna array 60 or that device 10 would likely exhibit superior wireless link quality with external non-millimeter wave device 72, device 10 may perform intra-RAT handover operations from the millimeter wave RAT used to communicate with external millimeter wave device 70-1 to the non-millimeter wave RAT used to communicate with external non-millimeter wave device 72. Device 10 may switch from conveying the wireless data stream using millimeter wave transceiver circuitry 28 (FIG. 3) to conveying the wireless data stream using non-millimeter wave transceiver circuitry (e.g., transceiver circuitry 24 or 26 of FIG. 3) with external non-millimeter wave device 72, as shown by wireless link 86. Device 10 may convey the wireless data stream over wireless link 86 using one or more non-millimeter wave antennas 40' that are separate from phased antenna array 60, as an example.

In another suitable arrangement, device 10 may use the sensor data to help maintain simultaneous wireless links with multiple external devices. For example, when device 10 is at location 76, device 10 may be capable of maintaining separate wireless links with external millimeter wave devices 70-1 and 70-2 (e.g., over beams 82 and 84). Device 10 may maintain separate wireless links with external millimeter wave devices 70-1 and 70-2 using the same phased antenna array or using two or more separate phased antenna arrays, for example. As another example, when device 10 is at location 78, device 10 may be capable of maintaining separate wireless links with external millimeter wave device 70-1 and external non-millimeter wave device 72 (e.g., over beam 96 and wireless link 86). The sensor data may, for example, identify when it is possible to begin performing wireless communications with multiple different external devices (e.g., devices of the same RAT such as external millimeter wave devices 70-1 and 70-2 or devices of separate RATs such as external millimeter wave device 70-2 and external non-millimeter wave device 72), may identify when such dual connections need to be dropped in favor of a single connection, or may be used to adjust connection settings associated with each link, as examples.

In one example, when the sensor data identifies that device 10 has moved from location 76 to location 78, as shown by arrow 92, communications manager 30 (FIG. 3) may switch from performing concurrent wireless communications with two external millimeter wave devices (e.g., external millimeter wave devices 70-1 and 70-2 over beams 82 and 84) to performing concurrent wireless communications with one external millimeter wave device 70-2 and one external non-millimeter wave device 72 (e.g., over beam 96 and wireless link 86).

The sensor data may be used to help expedite establishment or maintenance of one or more wireless links between device 10 and one or more of external devices such as external devices 70-1, 70-2, and 72 after device 10 has stopped moving (e.g., after device 10 has arrived at locations 74, 76, or 78 of FIG. 5). In another suitable arrangement, the sensor data may be used to predict a future location/orientation of device 10 (e.g., while device 10 is moving or when the sensor data indicates that device 10 is likely to begin moving) and thus a future external wireless device and/or beam orientation that will be used for communications. For example, the sensor data may identify a velocity or rotation of device 10 that can be used to predict future locations of device 10 for updating the wireless link(s) between device 10 and one or more of the external devices. This may allow device 10 to begin adjusting the wireless links in advance, thereby further reducing latency.

As another example, satellite navigation data (e.g., location data) in the sensor data may identify that device 10 is in a geographic location without coverage by an external millimeter wave device such as external millimeter wave devices 70-1 and 70-2. Device 10 may subsequently establish a non-millimeter wave communications link such as wireless link 86 with external non-millimeter wave device 72, thereby eliminating processing resources and time that would otherwise be used scanning the beam angle of phased antenna array 60 in search of external millimeter wave devices. The sensor data may also include statistical information about the typical or expected location of device 10 that is used to help predict how to adjust the wireless communications circuitry. For example, statistical information about repetitive motions may be used to rule out motion requiring handover (e.g., if the motion identified in the sensor data is a repetitive motion expected to return the device to a particular location, is associated with device 10 resting in the user's pocket, etc.). By using sensor data to help establish and maintain one or more wireless links in communications system 94, device 10 may ensure that continuous wireless communications are performed even as device 10 is moved over time without introducing excessive system latency associated with scanning through all possible beam angles using phased antenna array 60 at each device location.

Figure 6:
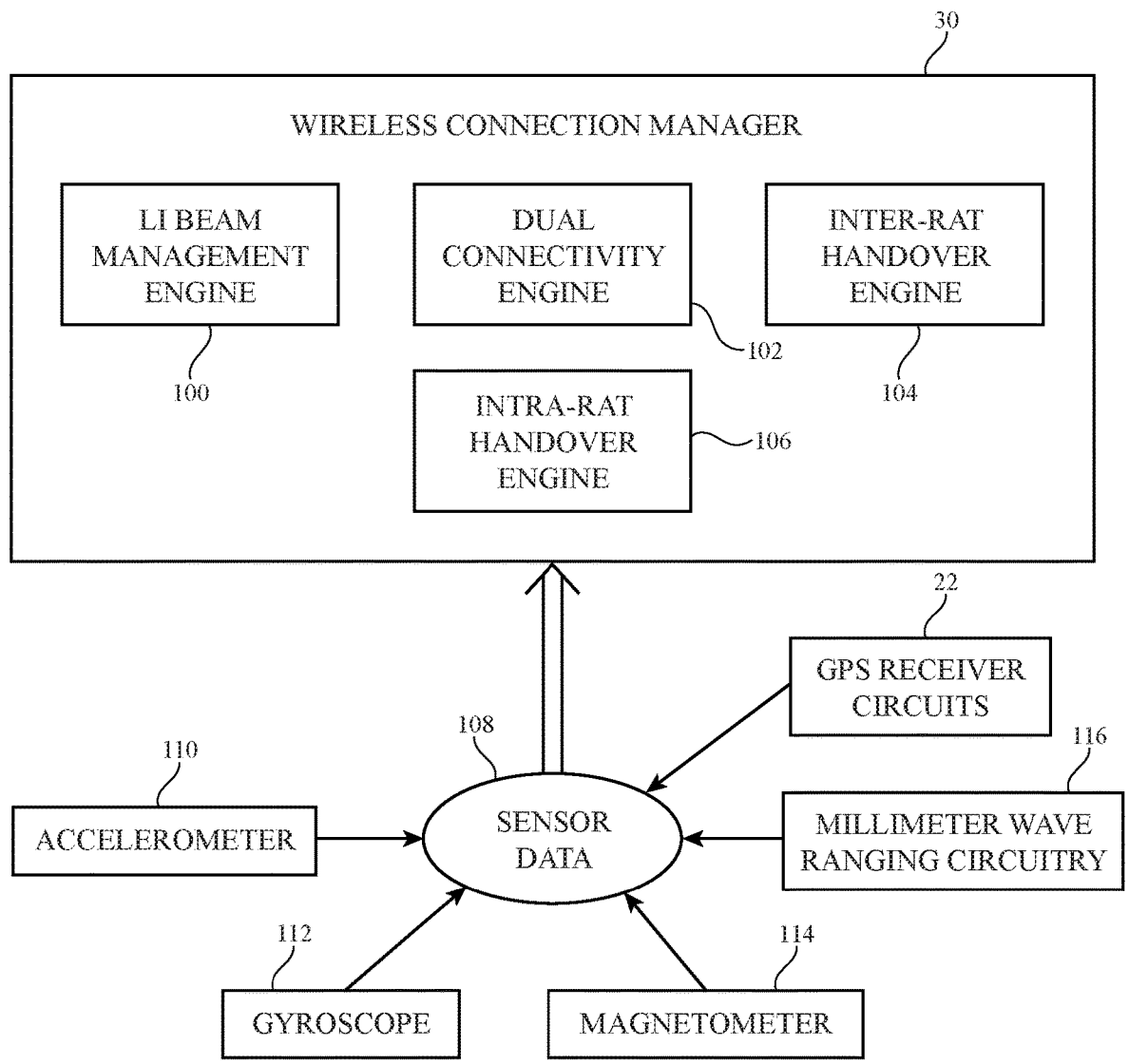
FIG. 6 is a diagram of an illustrative wireless communications manager in an electronic device that may perform sensor-based wireless link adjustments in accordance with some embodiments.

FIG. 6 is a diagram of wireless connection manager 30 of FIG. 3. As shown in FIG. 6, wireless communication manager 30 may include a beam steering engine such as physical layer (Layer 1 or L1) beam management engine 100, dual connectivity engine 102, inter-RAT handover engine 104, and intra-RAT handover engine 106. Engines 100, 102, 104, and 106 may be implemented using dedicated hardware and/or software operating on wireless communications circuitry 34 and/or control circuitry 14 of FIG. 3, for example. Engines 100, 102, 104, and 106 may perform wireless link management operations based on sensor data 108.

Sensor data 108 may include any desired sensor data generated by input-output devices 18 (FIG. 3). For example, sensor data 108 may include motion sensor data such as accelerometer data generated by accelerometer 110 and gyroscope data generated by gyroscope 112. Motion sensors such as accelerometer 110 and gyroscope 112 may generate sensor data indicative of how device 10 is moving or rotating and/or sensor data indicative of a present orientation of device 10 (e.g., relative to the ground). Sensor data 108 may include magnetometer data generated by magnetometer 114 (e.g., compass data indicative of the orientation of device 10 relative to the Earth's magnetic field).

Sensor data 108 include data generated by other components such as millimeter wave ranging circuitry 116 and GPS receiver circuits 22. For example, sensor data 108 may include location data generated by GPS receiver circuits 22 that identifies the geographic position of device 10. Sensor data 108 may also include millimeter wave ranging data (e.g., millimeter wave RADAR data) generated by millimeter wave ranging circuitry 116. Millimeter wave ranging circuitry 116 may transmit radio-frequency signals using transceiver circuitry 28 (FIG. 3), may receive a reflected version of the transmitted radio-frequency signals that have been reflected off of external objects, and may process the transmitted and received signals to identify a range between device 10 and the external objects. These types of sensor data and other sensor data 108 may be used by wireless connection manager 30 in managing wireless links with one or more millimeter wave external devices and/or one or more non-millimeter wave external devices.

L1 beam management engine 100 may use sensor data 108 to adjust the beam steering of the phased antenna array. The sensor data may, for example, identify how device 10 has moved or rotated over time (e.g., sensor data from accelerometer 110, gyroscope 112, magnetometer 114, GPS receiver circuits 22, and/or millimeter wave ranging circuitry 116). L1 beam management engine 100 may use this information to update beam steering to point towards an external millimeter wave device (e.g., external millimeter wave devices 70-1 or 70-2 of FIG. 5) before, during, or after device 10 has stopped moving. This may allow device 10 to continue communications with a particular external millimeter wave device without having to spend time scanning over all possible beam angles despite the motion of device 10. L1 beam management engine 100 may perform rate adaptation operations based on sensor data 108 if desired.

Dual connectivity engine 102 may use sensor data 108 to establish, maintain, or stop using multiple concurrent wireless links with two external millimeter wave devices or with one external millimeter wave device and one external non-millimeter wave device. The sensor data may, for example, identify when device 10 has moved or is going to move to a location where concurrent wireless links are possible (e.g., when device 10 has moved to location 76 where concurrent wireless links over beams 82 and 84 or when device 10 has moved to location 78 where concurrent wireless links over beam 96 and wireless link 86 are possible, as shown in FIG. 5). Dual connectivity engine 102 of FIG. 6 may establish concurrent wireless links when the sensor data indicates that such operations are possible, for example. The sensor data may also identify when concurrent wireless links are or will no longer possible (e.g., when device 10 has moved away from locations 76 or 78 of FIG. 5). Dual connectivity engine 102 may stop using one of the concurrent wireless links when the sensor data indicates that concurrent wireless links are no longer possible. Dual connectivity engine 102 may perform other adjustments associated with concurrent wireless links such as frequency adjustments to one or both links, transmit power level adjustments to one or both links, etc.

Intra-RAT handover engine 106 may use sensor data 108 to perform handover operations between different external millimeter wave devices (e.g., external millimeter wave devices 70-1 and 70-2 of FIG. 5). For example, when the sensor data indicates that device 10 has moved or will move to location 76 and that a wireless link with external millimeter wave device 70-2 of FIG. 5 is likely to have superior link quality than a wireless link with external millimeter wave device 70-1, engine 106 may perform intra-RAT handover operations to switch from performing wireless communications with external millimeter wave device 70-1 to performing wireless communications with external millimeter wave device 70-2 (e.g., without noticeably interrupting the conveyed wireless data). Intra-RAT handover engine 106 may also perform intra-RAT handover operations by changing the operating frequency used by phased antenna array 60 (e.g., with the same external millimeter wave device or with a new external millimeter wave device). Performing intra-RAT handover operations in this way may, for example, allow for a new wireless link to be established more rapidly and with less data loss than in scenarios where device 10 first scans over all beam angles using phased antenna array 60 before determining that external millimeter wave device 70-2 should be used for further communications instead of external millimeter wave device 70-1.

Inter-RAT handover engine 104 may use sensor data 108 to perform handover operations between an external millimeter wave device and an external non-millimeter wave device. For example, when the sensor data indicates that device 10 has moved to location 78 of FIG. 5 and that an external millimeter wave device is not within the range or field of view of phased antenna array 60 (or that a millimeter wave link will likely exhibit a lower data rate than a non-millimeter wave link), engine 104 may perform inter-RAT handover operations to switch from performing wireless communications with the external millimeter wave devices to performing wireless communications with external non-millimeter wave device 72 (e.g., using non-millimeter wave antenna 40' and wireless link 86 of FIG. 5). If desired, engine 104 may perform inter-RAT handover operations to switch to non-millimeter wave communications when the relatively high data rate supported by a millimeter wave link is no longer needed, or to switched to millimeter wave communications when the relatively high data rate is needed (e.g., based on the wireless data requirements of processing operations being performed on device 10). For example, engine 104 may switch from performing 5G communications to 4G communications or may switch from performing IEEE 802.1 ad communications to Wi-Fi communications based on sensor data 108. This inter-RAT handover operation may be performed without significant losses in the wireless data stream being conveyed by device 10. Performing inter-RAT handover operations in this way may, for example, allow for a new wireless link to be established more rapidly and with less data loss than in scenarios where device 10 first scans over all beam angles using phased antenna array 60 before determining that no external millimeter wave devices are available (reachable) and that a non-millimeter wave link should be used instead.

Figure 7:
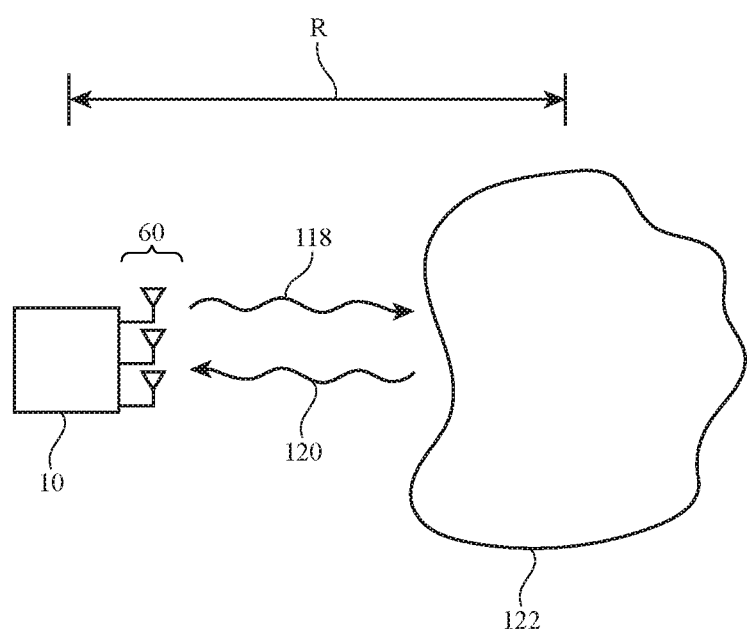
FIG. 7 is a diagram showing how an illustrative electronic device may perform spatial ranging operations using phased antenna arrays and millimeter and centimeter wave signals in accordance with some embodiments.

FIG. 7 is a diagram showing how device 10 may gather sensor data using millimeter wave ranging circuitry 116 of FIG. 6. As shown in FIG. 7, the millimeter wave ranging circuitry may use one or more phased antenna arrays 60 to transmit millimeter wave ranging signals 118. Device 10 may receive a reflected version 120 of the transmitted signals 118 that have been reflected off of external object 122. Device 10 may process signals 118 and 120 to identify a distance (range) R between device 10 and external object 122 (e.g., by comparing the time at which signals 120 are received with a timestamp in transmitted signals 118, etc.). This range information may form a part of sensor data 108 of FIG. 6.

Figure 8:
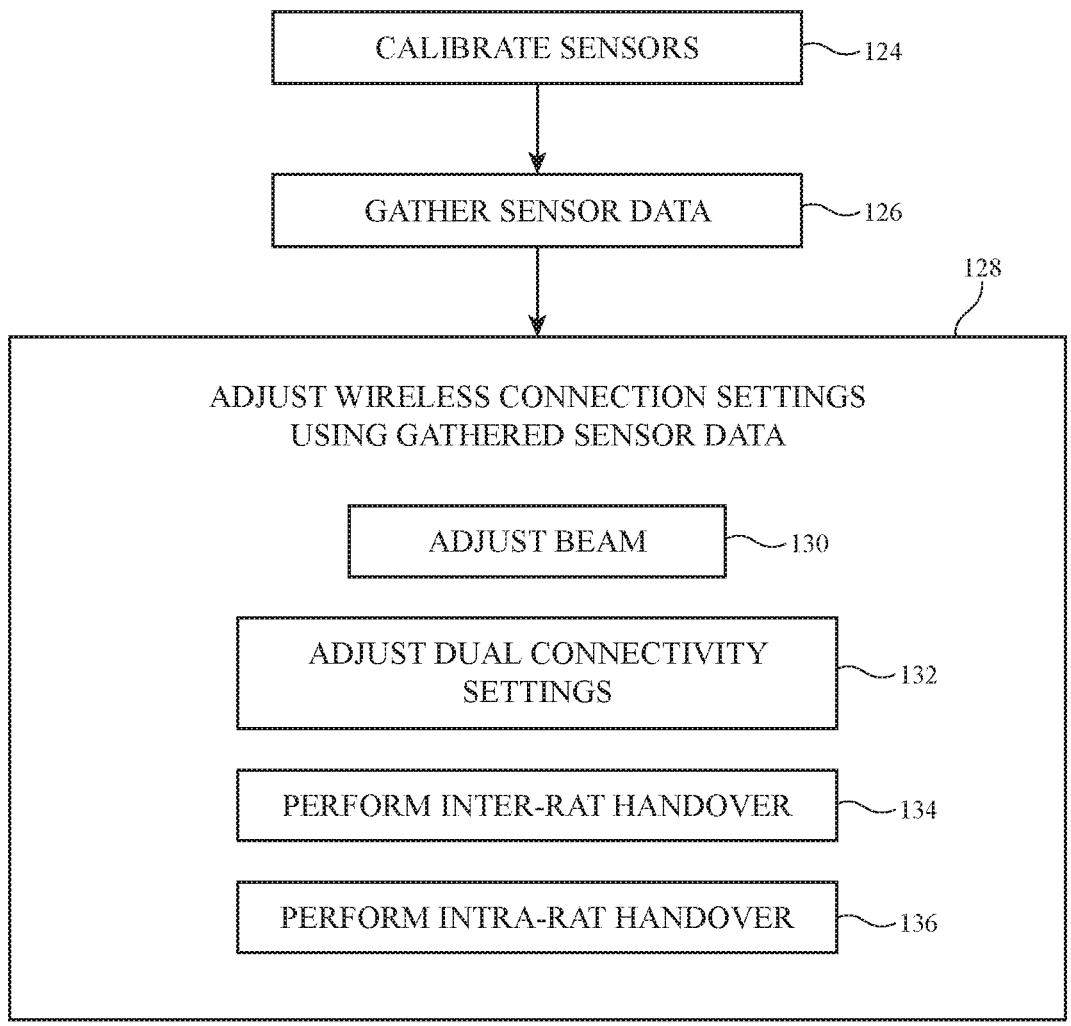
FIG. 8 is a flow chart of illustrative steps involved in performing sensor-based wireless link adjustments in accordance with some embodiments.

FIG. 8 is a flow chart of illustrative steps that may be performed by device 10 (control circuitry 14 of FIG. 3) in maintaining one or more wireless links using communication manager 30 of FIG. 6. At step 124, control circuitry 14 may calibrate the sensors on device 10. This may, for example, ensure that the sensors (e.g., accelerometer 110, gyroscope 112, magnetometer 114, ranging circuitry 116, and receiver circuits 22 of FIG. 6) generate reliable sensor data. The calibration operations of step 124 may be performed during manufacture of device 10 or may be formed during regular operations of device 10 in the field. The calibration operations may produce calibration data stored at control circuitry 14. The calibration data may include offset values or other calibration data that is to be applied to the sensor data. The calibration data may include information identifying how certain values of sensor data 108 correlate with different beam patterns (directions) for phased antenna array 60. If desired, device 10 may periodically perform calibration operations to update the calibration data stored on control circuitry 14 over time.

At step 126, device 10 may gather sensor data. For example, accelerometer 110, gyroscope 112, magnetometer 114, ranging circuitry 116, and/or receiver circuits 22 of FIG. 6 may generate sensor data 108.

At step 128, wireless connection manager 30 (FIG. 6) may adjust the wireless connection settings of wireless communications circuitry 34 (FIG. 3) based on the gathered sensor data. For example, L1 beam management engine 100 may perform beam steering adjustments or other physical layer (L1) adjustments to the beam based on sensor data 108 (at step 130). Dual connectivity engine 102 may perform dual connectivity operations such as the establishment, adjustment, or cessation of multiple concurrent wireless links with multiple external millimeter wave devices and/or with an external millimeter wave device and an external non-millimeter wave device based on sensor data 108 (at step 132). Inter-RAT handover engine 104 may switch between transceiver circuitry 28 and transceivers circuitry 26 and/24 (FIG. 3) to perform an inter-RAT handover between an external millimeter wave device and an external non-millimeter wave device based on sensor data 108 (at step 134). Intra-RAT handover engine 106 may perform handover operations between two different external millimeter wave devices and/or between frequency bands based on sensor data 108 (at step 136). Different combinations of steps 130-136 may be performed based on sensor data 108 if desired (e.g., device 10 may adjust beam steering over two concurrent millimeter wave links, device 10 may cease concurrent operations over two millimeter wave links and switch to a single non-millimeter wave link, etc.). One or more of steps 130-136 may be omitted. Steps 130-136 may be performed in any desired order. Two or more of steps 130-136 may be performed concurrently if desired. Device 10 may continuously or semi-continuously repeat the steps of FIG. 8 to continue to gather sensor data and update wireless link settings over time (e.g., as device 10 moves over time).

Figure 9:
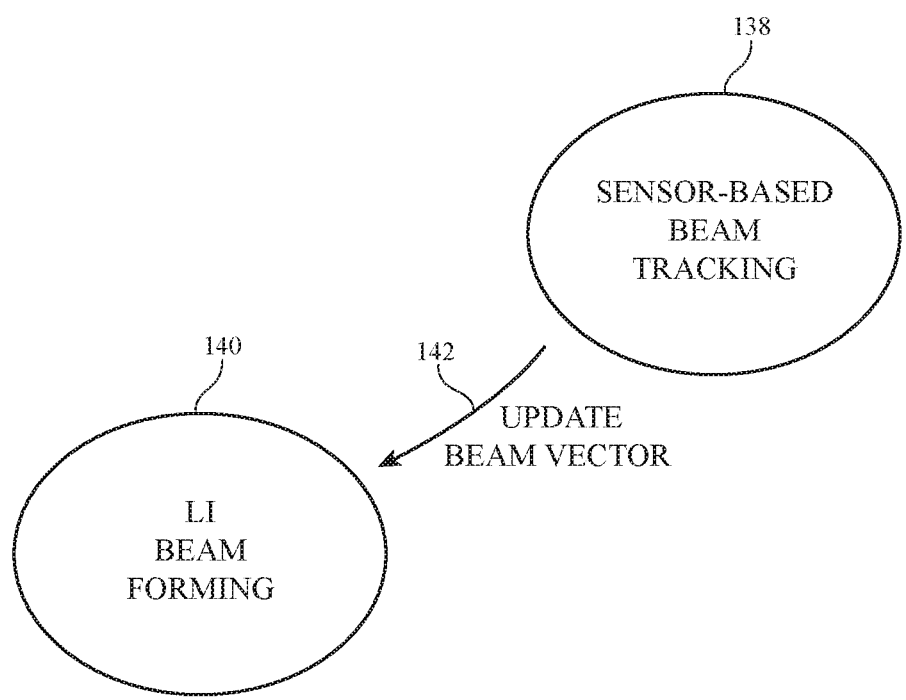
FIG. 9 is a diagram showing how an illustrative wireless communications manager may update physical layer beam forming based on sensor data in accordance with some embodiments.

L1 beam management engine 100 (FIG. 6) may perform beam steering adjustments based on sensor data 108 without affecting the standardized L1 beam scanning operation performed by engine 100. As shown in FIG. 9, the L1 beam management engine may perform a physical layer (L1) beam forming operation 140. Operation 140 (sometimes referred to herein as algorithm 140) may be based on active measurements of the link quality of the wireless link handled by phased antenna array 60. Operation 140 may, for example, include gathering signal-to-noise ratio information using transceiver circuitry 28 (FIG. 3), identifying changes in the signal-to-noise ratio information, and performing coarse or fine-step beam sweeping based on the magnitude of the change in signal-to-noise ratio information. This process may be performed to update the beam direction after detecting a reduction in link quality (signal-to-noise ratio).

The L1 beam management engine may concurrently perform sensor-based beam tracking operation 138. Operation 138 may involve processing sensor data 108 to determine whether the sensor data indicates that a beam steering adjustment needs to be made or that a beam steering adjustment will need to be made in the future (e.g., because device 10 has moved from its original location or because device 10 is moving towards a particular location with a particular velocity). Operation 138 is performed independently from L1 beam forming operation 140. When sensor data 108 indicates that the beam direction will need to be updated, the L1 beam forming engine may provide an updated beam vector 142 as an input to L1 beam forming operation 140. L1 beam forming operation 140 may then steer the beam using beam vector 142. L1 beam forming operation 140 may subsequently measure signal-to-noise ratio at this new beam vector and perform coarse and/or fine adjustments based on the magnitude of the signal-to-noise ratio. In this way, L1 beam forming may be proactively (predictively) updated (initialized) using sensor data 108 rather than waiting until a drop in signal-to-noise ratio is measured before the beam is steered to a new location. In addition, L1 beam forming algorithm 140 may continue to execute so that corrective measures may be taken if there is a measured decreased signal-to-noise ratio (e.g., so that the beam may be scanned as necessary even if sensor data 108 does not identify that an updated beam vector is to be used).

Figure 10:
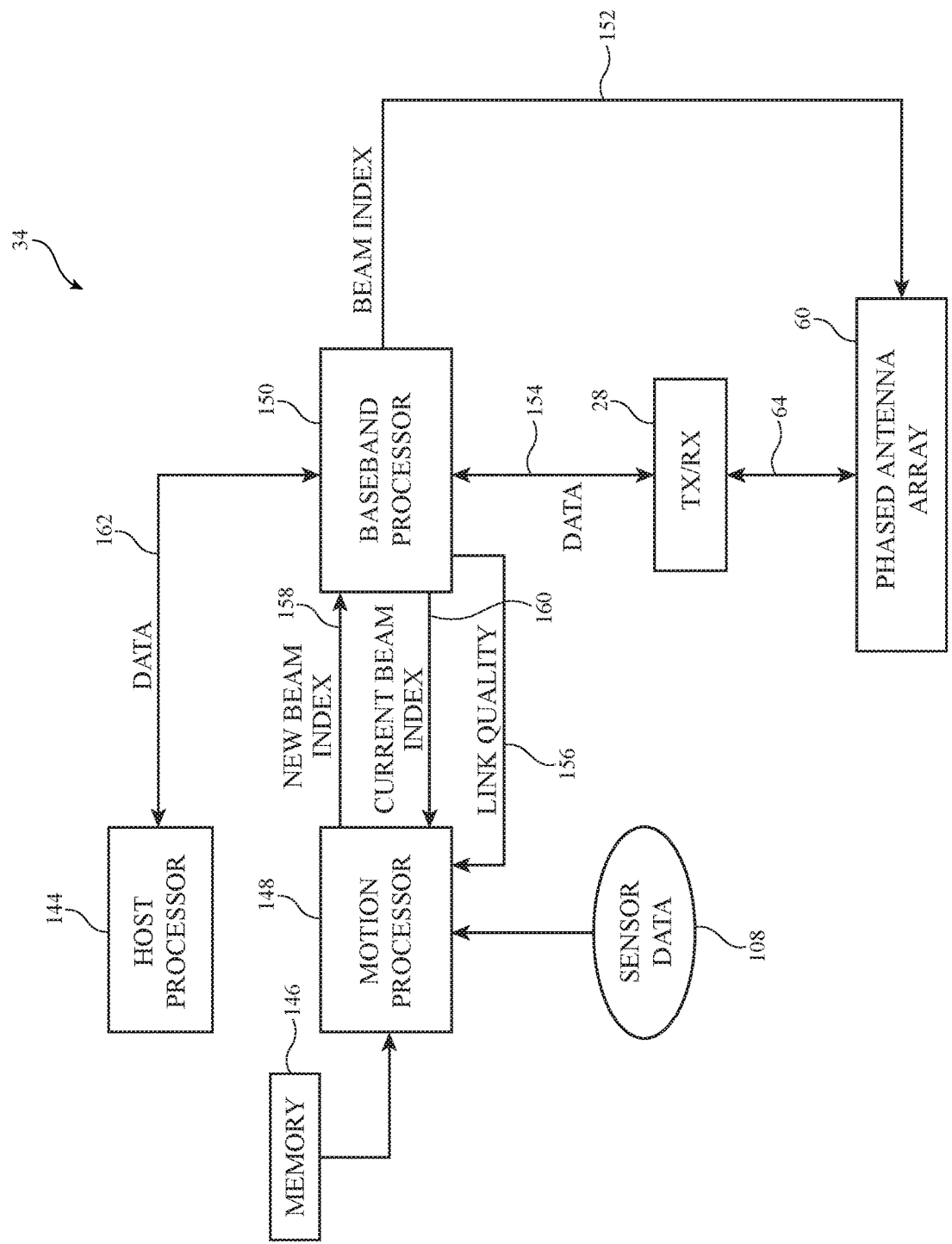
FIG. 10 is a diagram of illustrative wireless circuitry that may update physical layer beam forming based on sensor data in accordance with some embodiments.

FIG. 10 is a schematic diagram of exemplary components that may be provided within wireless communications circuitry 34 for performing operations 140 and 138 of FIG. 9. As shown in FIG. 10, wireless communications circuitry 34 may include host processor 144 that provides data (e.g., a stream of data packets DATA) for transmission to baseband processor 150. Baseband processor 150 may convey the data to transceiver circuitry 28 over path 154. Transceiver circuitry 28 may transmit radio-frequency signals that include the data using phased antenna array 60 and transmission line path 64 (e.g., the radio-frequency signals transmitted by phased antenna array 60 may include wireless data packets DATA).

Baseband processor 150 may control the beam steering of phased antenna array 60 using control signals provided to phased antenna array 60 over path 152 (e.g., control signals 58 of FIG. 4). The control signals may configure phased antenna array 60 to produce a signal beam in a particular pointing direction. Each of the pointing directions may be labeled with a corresponding beam index. A codebook at baseband processor 150 may be used to map beam indexes to pointing directions, for example.

Baseband processor 150 may provide information on the current beam being used by phased antenna array 60 (e.g., a current beam index) to motion processor 148 over path 160. Motion processor 148 may be used to implement L1 beam management engine 100 of FIG. 6, for example.

Motion processor 148 may receive calibration data or other stored information from memory 146. Baseband processor 150 may also measure link quality information associated with the current beam such as signal-to-noise ratio information that is provided to motion processor 148 over path 156. Motion processor 148 may perform L1 beam forming operation 140 of FIG. 9 using the link quality information and current beam index received from baseband processor 150. While performing operation 140, motion processor 148 may control baseband processor 150 (over path 158) to update the beam of phased antenna array 60 using a new beam index (e.g., to steer the beam to the pointing angle associated with the new beam index when a change in signal-to-noise ratio is detected).

Motion processor 148 may receive sensor data 108. Motion processor 148 may process sensor data 108 to perform sensor-based beam tracking operation 138 of FIG. 9 (e.g., while processing step 130 of FIG. 8). Motion processor 148 may identify an updated beam vector to use (e.g., beam vector 142 of FIG. 9) based on sensor data 108, may use the updated beam vector as an input to operation 140 (FIG. 9), and/or may provide the beam index associated with the updated beam vector to baseband processor 150 over path 158. Baseband processor 150 may use this beam index to adjust the beam of phased antenna array 60. In this way, motion processor 148 may perform both L1 beam forming operations and independent sensor-based beam tracking for L1 beam management engine 100 (FIG. 6). The example of FIG. 10 is merely illustrative. In general, any desired computational split architecture and interfacing architecture may be used.

Figure 11:
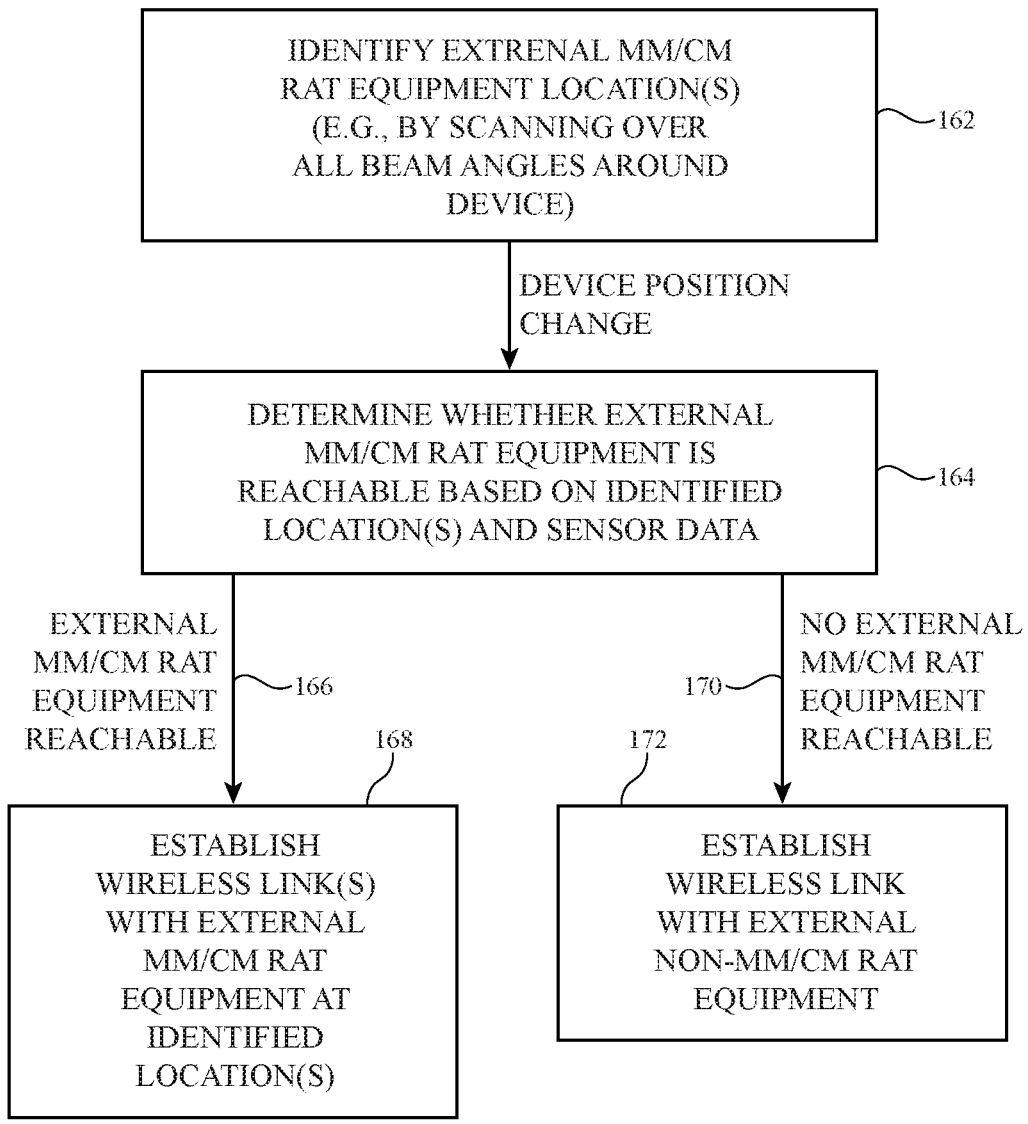
FIG. 11 is a flow chart of illustrative steps involved in establishing wireless links with external communications equipment in accordance with some embodiments.

Device 10 may continuously or semi-continuously identify the locations of external wireless devices relative to device 10 over time. Device 10 may later use this information with sensor data 108 to determine when wireless link adjustments are to be made (e.g., without scanning the beam of phased antenna array 60 over its entire field of view). FIG. 11 is a flow chart of illustrative steps that may be performed by device 10 to establish a wireless link with either an external millimeter wave device or an external non-millimeter wave device based on sensor data 108.

At step 162, device 10 may identify the locations of each external millimeter wave device around (e.g., within a line of sight with) device 10. For example, as device 10 moves, rotates, or scans over different beam angles, device 10 may track angles (locations) where there are no external millimeter wave devices present and where there are external millimeter wave devices presence (e.g., using the sensors on device 10 and/or using information about beam angles at which successful communications were performed with external millimeter wave devices). Device 10 may continue to gather and track information for different angles around the device during normal device operation (e.g., during normal communications operations until the angles around substantially all of device enough angles around device 10 have been characterized). Device 10 may gather this information for different locations (e.g., as device 10 moves within a room or between different locations). In this way, device 10 may accumulate and store a virtual representation of the space around device 10 and the locations (directions) within that space where there are external millimeter wave devices present. Device 10 may store information identifying which external electronic device exhibits the best signal quality (signal strength) for each position and/or orientation of device 10.

After device 10 has changed positions (e.g., by being moved, rotated, carried to another location, etc.), processing may proceed to step 164. Device 10 may gather sensor data 108 (FIG. 6) that identifies this change in positions (e.g., that identifies a new position or orientation for device 10). At step 164, device 10 may determine whether any external millimeter wave devices are reachable (e.g., within the field of view) for phased antenna array 60 after the position change. Device 10 may perform this determination based on the locations of the external millimeter wave devices identified while processing step 162 and the gathered sensor data 108. For example, if device 10 determines that an external millimeter wave device is located at 30 degrees with respect to an arbitrary axis (while processing step 162) and identifies that device 10 has rotated by 15 degrees such that the external device still lies within the field of view of phased antenna array 60, device 10 may determine that the external millimeter wave device is reachable. If device 10 determines that device 10 has moved to a location where no external millimeter wave devices are located within the field of view of phased antenna array 60, device 10 may determine that no external millimeter wave devices are reachable.

If one or more external millimeter wave devices are reachable, processing may proceed to step 168 as shown by path 166. At step 168, device 10 may establish a wireless link with one or more of the reachable external millimeter wave devices (e.g., by steering the beam of phased antenna array 60 towards the external device). If desired, device 10 may establish the wireless link with the external millimeter wave device having the best signal quality for that position/orientation of device 10. If no external millimeter wave devices are reachable, processing may proceed to step 172, as shown by path 170.

At step 172, device 10 may establish a wireless link with one or more external non-millimeter wave devices (e.g., external non-millimeter wave device 72 of FIG. 5). In general, external millimeter wave devices may support higher data rates than external non-millimeter wave devices. Maintaining communications with the external millimeter wave devices may allow continued communications at these high data rates. However, if no devices are available, communications may be continued over a non-millimeter wave link. While the non-millimeter wave link may not exhibit the same data rate as a millimeter wave link, the non-millimeter wave link may allow device 10 to continue conveying a stream of wireless data uninterrupted with the communications network (e.g., system 94 of FIG. 5). By performing the operations of FIG. 11 using sensor data 108, device 10 need not scan over all possible beam angles for phased antenna array 60 after changing positions before identifying that no external millimeter wave devices are available. This may allow device 10 to revert to non-millimeter wave communications with less latency and less risk of loss in the wireless data stream. In addition, device 10 may simply compare its current orientation and/or position to pre-characterized information about its surroundings (e.g., information generated while processing step 162) to determine which external device will exhibit the best signal quality for its current orientation and/or position. Wireless communications circuitry 34 may be updated accordingly (e.g., by steering the beam towards this external device, by performing handover operations, adjusting dual connectivity settings, etc.). Because these operations are augmented using sensor data 108, the operations may be performed without scanning the phased antenna array over all beam steering angles each time device 10 moves, thereby minimizing the risk of data loss or interruption.

As described above, one aspect of the present technology is the gathering and use of data available from various sources to improve the operation of wireless communications circuitry in performing wireless communications with other wireless devices. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to establish, maintain, and/or adjust one or more wireless communications links. Accordingly, use of such personal information data enables users to interact with electronic devices having satisfactory wireless communications performance. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of wireless communications, the present technology can be configured to allow users to select to "opt in" or "opt out" of participation in the collection of personal information data during registration for services or anytime thereafter. In another example, users can select not to perform wireless communications or other operations that gather personal information data. In yet another example, users can select to limit the length of wireless communications performed using gathered personal information data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, wireless communications may be performed based on non-personal information data or a bare minimum amount of personal information, such as the content being requested by the device associated with a user, other non-personal information available to the display system, or publicly available information.

The foregoing is merely illustrative and various modifications can be made by those skilled in the art without departing from the scope and spirit of the described embodiments. The foregoing embodiments may be implemented individually or in any combination.

What is claimed is:

1. An electronic device configured to communicate with first and second external devices, the electronic device comprising:
 a phased antenna array configured to convey wireless data using radio-frequency signals at a frequency greater than 10 GHz with the first external device;
 a sensor configured to generate sensor data, the sensor having a millimeter wave ranging engine configured to transmit millimeter wave signals using the phased antenna array that produce corresponding reflected millimeter wave signals upon the transmitted millimeter wave signals reflecting off an external object, receive the reflected millimeter wave signals, and generate range information associated with a distance between the electronic device and the external object, the sensor data comprising the range information; and
 control circuitry configured to perform a handover of the wireless data using the range information.

2. The electronic device defined in claim 1, wherein the control circuitry is configured to perform the handover of the wireless data from the first external device to the second external device.

3. The electronic device defined in claim 2, wherein the phased antenna array is configured to convey the radio-frequency signals at the frequency with the second external device after performing the handover.

4. The electronic device defined in claim 1, wherein the radio-frequency signals are in a first frequency band and the control circuitry is configured to perform the handover by controlling the phased antenna array to convey the radio-frequency signals in a second frequency band that is different from the first frequency band.

5. The electronic device defined in claim 4, wherein the control circuitry is configured to perform the handover by controlling the phased antenna array to convey the radio-frequency signals in the second frequency band with the second external device.

6. The electronic device defined in claim 1, wherein the sensor further comprises an accelerometer and the sensor data further comprises accelerometer data generated by the accelerometer.

7. The electronic device defined in claim 6, further comprising a satellite navigation receiver that receives satellite navigation signals over an antenna that is separate from the phased antenna array, wherein the sensor data further comprises location data generated using the satellite navigation receiver.

8. The electronic device defined in claim 1, wherein the sensor further comprises a gyroscope and the sensor data further comprises gyroscope data generated by the gyroscope.

9. The electronic device defined in claim 1, wherein the sensor further comprises a magnetometer and the sensor data further comprises magnetometer data generated by the magnetometer.

10. The electronic device defined in claim 1, wherein the control circuitry is configured to perform physical layer beam adjustments to the phased antenna array after performing the handover.

11. The electronic device of claim 1, wherein the electronic device comprises an electronic device selected from the group consisting of: a cellular telephone, a tablet computer, a wristwatch, and a laptop computer.

12. The electronic device of claim 1, further comprising a dual connectivity engine configured to establish concurrent wireless links with the first external device and the second external device.

13. The electronic device of claim 1, wherein the control circuitry is further configured to predict a future location or orientation of the electronic device using the sensor data.

14. An electronic device configured to communicate with first and second external devices, the electronic device comprising:
   a phased antenna array configured to convey wireless data using radio-frequency signals at a frequency greater than 10 GHz with the first external device;
   an antenna separate from the phase antenna array and configured to convey the wireless data using additional radio-frequency signals at an additional frequency less than 10 GHz;
   a sensor configured to generate sensor data; and
   control circuitry configured to perform a handover of the wireless data from the first external device to the second external device based on the sensor data by switching from conveying the wireless data using the phased antenna array to conveying the wireless data using the antenna.

15. The electronic device defined in claim 14, further comprising:
   a first transceiver configured to transmit the radio-frequency signals at the frequency prior to the handover; and
   a second transceiver configured to transmit the additional radio-frequency signals at the additional frequency after the handover.

16. A method of operating an electronic device having a phased antenna array, a sensor, and control circuitry, wherein the electronic device is configured to perform wireless communications with a first external device using a millimeter wave radio access technology and with a second external device using a non-millimeter wave radio access technology, the method comprising:
   with the control circuitry, gathering information identifying a first location of the first external device and a second location of the second external device;
   with the sensor, gathering sensor data indicative of motion of the electronic device;
   with the control circuitry, using the phased antenna array to determine whether the first external device is within a field of view of the phased antenna array based on the sensor data; and
   with the control circuitry, establishing a wireless link with the second external device using the non-millimeter wave radio access technology in response to determining that the first external device is outside of the field of view of the phased antenna array.

17. The method defined in claim 16 further comprising with the phased antenna array, transmitting radio-frequency signals to the first external device using the millimeter wave radio access technology prior to establishing the wireless link with the second external device.

18. The method of claim 16 further comprising:
   with the control circuitry, responsive to determining that the first external device is within the field of view of the phased antenna array, controlling the phased antenna array to continue transmitting the radio-frequency signals to the first external device using the millimeter wave radio access technology.

19. The method defined in claim 18 wherein the sensor comprises an accelerometer and wherein the sensor data comprises accelerometer data.

20. The method defined in claim 18 wherein the sensor comprises a gyroscope and wherein the sensor data comprises gyroscope data.

21. The method defined in claim 18 wherein the sensor comprises a magnetometer and wherein the sensor data comprises magnetometer data.

* * * * *